United States Patent [19]
Seki et al.

[11] Patent Number: 5,797,492
[45] Date of Patent: Aug. 25, 1998

[54] INFORMATION STORAGE MEDIUM PACKAGING BODY

[75] Inventors: Seizo Seki; Masayuki Kawajiri; Takashi Asakura, all of Tokyo-To, Japan

[73] Assignees: Sony Corporation; Dai Nippon Printing Co., Ltd., both of Japan

[21] Appl. No.: 705,629

[22] Filed: Aug. 30, 1996

[30] Foreign Application Priority Data

Sep. 8, 1995 [JP] Japan ................... 7-231537

[51] Int. Cl.⁶ .......................................... B65D 85/672
[52] U.S. Cl. ................... 206/387.1; 206/484; 428/195; 428/913
[58] Field of Search .................. 206/387.1, 484; 428/195, 913, 914, 213

[56] References Cited

U.S. PATENT DOCUMENTS

| | | | |
|---|---|---|---|
| 4,856,857 | 8/1989 | Takeuchi et al. | 350/3.6 |
| 4,971,646 | 11/1990 | Schell et al. | 156/244.17 |
| 5,360,105 | 11/1994 | Morita | 206/387.1 |
| 5,405,008 | 4/1995 | Tanaka et al. | 206/387.1 |
| 5,505,375 | 4/1996 | Sato et al. | 206/387.1 |
| 5,515,972 | 5/1996 | Shames | 206/472 |
| 5,599,765 | 2/1997 | Ohshima et al. | 503/227 |

*Primary Examiner*—Paul T. Sewell
*Assistant Examiner*—Nhan T. Lam
*Attorney, Agent, or Firm*—Parkhurst & Wendel, LLP

[57] ABSTRACT

An information storage medium packaging body comprises a case 30 for containing an information storage medium, a packaging film 10 for packing the case 30, and the packaging film 10 includes a heat shrinkable film 11. A hologram layer 20 is formed on a front surface of the heat shrinkable film 11. An offset preventing layer 23 and a printed pattern layer 12 are formed on the back surface of the heat shrinkable layer 11.

7 Claims, 1 Drawing Sheet

INFORMATION STORAGE MEDIUM PACKAGING BODY

BACKGROUND OF THE INVENTION

The present invention relates to an information storage medium packaging body for packaging an information storage medium for storing audio information or video information, and a casing for containing the information storage medium. In the present application, the information storage medium means video tapes or cassette tapes.

As packaging films for information storage mediums for packaging information storage mediums for storing audio information or video information, and cases for containing the information storage mediums, various packaging films have been conventionally proposed and developed. Especially packaging films including heat shrinkable films are easy to package irregular-shaped objects, and can tie articles by using its shrink property and can be expected to have the function of guaranteed packaging. Such packaging film elongates shelf lives, finishes the packages of information storage mediums and their cases tight, and is transparent and additionally has improved brilliance.

The above-described information storage medium packaging film has, on the front surface, required printed patterns, such as letters, figures, marks, patterns, etc., which are applied by printing means, such as offset printing, gravure or others, ornamentally effective for improving commodity values and sales appeal of the information storage medium.

The printing patterns are applied by using especially ink compositions of fluorescent colors and light emitting colors, or gold and silver ink compositions, or others, and visually exhibit three-dimensional effect and relief effects, etc.

In addition thereto, sometimes the front surface of the packaging film is subjected to gold, silver or other color foil hot-stamping.

The ornamental effect of such patterns, however, is one-dimensional and lacks variations. It is required that more innovational designs, unique designs, distinguishable designs, or others be applied to the front surface of the packaging film.

Especially, manufacturers of products of innovationally developed information storage mediums or others, and their dealers, etc. wish to apply to the surfaces of the packaging films thereof indications which effectively hinder counterfeiting their new products.

In view of this point the present invention was made, and an object of the present invention is to provide an information storage medium packaging body which can exhibit not only ornamental effect addition to the ornamental effect of the conventional printed patterns, etc., but also the function of prohibiting counterfeiting products, etc.

SUMMARY OF THE INVENTION

The present invention relates to an information storage medium packaging body comprising an information storage medium for storing audio information or video information, a case for containing the information storage medium, and a packaging film for packaging the case, the packaging film comprising a heat shrinkable film; a hologram layer formed on one surface of the heat shrinkable film; and an offset preventing layer formed on the other surface of the heat shrinkable film, for preventing offset of the hologram layer.

According to the present invention, owing to ornamental effect of the hologram layer, images can be seen three-dimensional; patterns, shapes, etc. are changed at view angles; and new ornamental effects can be achieved synergistically by the above-described both effects attributed to the ornamental effect of the hologram layer. Furthermore, the provision of the hologram layer prohibits counterfeiting information storage medium wrapped by the packaging body.

DETAILED DESCRIPTION OF THE INVENTION

An embodiment of the present invention will be explained with reference to the drawings attached hereto. FIGS. 1 to 4 are views showing an embodiment of the information storage medium packaging body according to the present invention.

Figure 3:
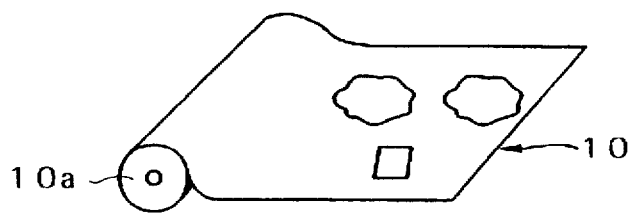
FIG. 3 is a view of the packaging film played out from a roll.
Figure 4:
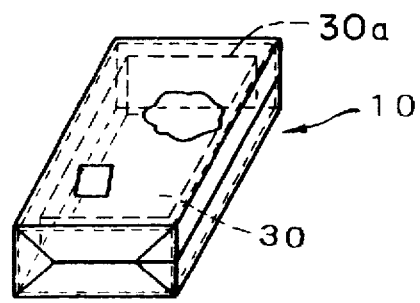
FIG. 4 is a view of a case containing an information storage medium, which is packaged with the packaging film.

In FIGS. 3 and 4, an information storage medium packaging film 10 is played out from a roll 20a to be used for packaging information storage mediums for storing audio information or video information. That is, in FIG. 4, an information storage medium 30a is placed in a case 30, and the case 30 is packaged with a packaging film 10. The information storage medium 30a, the case 30 and the packaging film 10 constitute the information storage medium packaging body according to the present invention.

Figure 1:
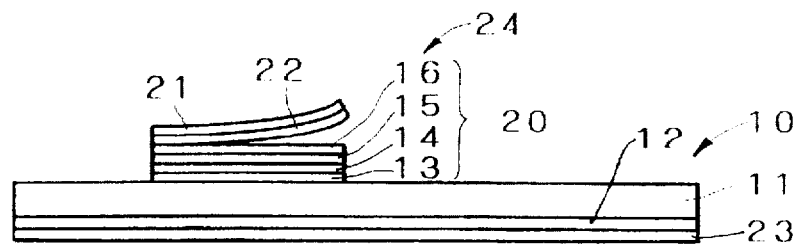
FIG. 1 is a view of a structure of layers of the packaging film used in the information storage medium packaging body.
Figure 2:
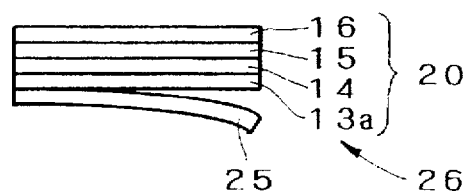
FIG. 2 is a view of a variation of the packaging film.

As shown in FIG. 1, the packaging film 10 comprises a heat shrinkable film 11, a hologram layer 20 provided on one surface of the heat shrinkable film 11, and a printed pattern layer 12 and an offset preventing layer 23.

Then, the respective members will be explained.

In the present invention, the heat shrinkable film 11 may be a biaxially oriented film or sheet mainly comprising a known resin, such as polyethylene, polyvinyl chloride, polypropylene, polyvinylidene chloride, polyester, polystyrene, ethylene-vinyl acetate copolymer, ionomer resin, or others.

The heat shrinkable film 11 has different thicknesses depending on uses, kinds of article to be packaged, methods of shrink packaging, etc., and preferably has a thickness of, e.g., about 5 to 400 μ, more preferably about 10 to 300 μm.

Then, in terms of the shrinkage of the heat shrinkable film 11, the heat shrinkable film 11 may be a biaxially oriented film or sheet having shrinkage rates of 3 to 15% in the longitudinal direction and 4 to 20% in the lateral direction. With a high shrinkage rate, however, phenomena where printed patterns provided on the printed pattern layer or images, such as holograms, provided on the hologram layer has are distorted or dropped, or other phenomena unpreferably take place. In the present invention, it is most preferred that images provided on the hologram layer 20 are arranged so that a design-provided portion, such as a portion corresponding to the hologram layer 20, etc., of the heat shrinkable film has shrinkage rates of less than 5% in the lateral and the longitudinal directions.

It is necessary that the heat shrinkable film 11 has heat shrinkability because the heat shrinkable film 11 is subjected to bi-directional seal, tri-directional seal or others before being passed through a shrink tunnel (not shown), and the heat shrinkable film 11 must have wide ranges of a heat seal temperature and a high heat-sealing strength.

In terms of the shrinkage temperature of the heat shrinkable film 11, preferably the heat shrinkable film 11 is a film or sheet having a wide range of a shrinkage temperature and a good shrinkability at low temperatures for good workability and not affecting the contents.

In supplying the rolled heat shrinkable film, there is a possibility where the hologram layer 20 might be offset, by a taking-up pressure, onto the back surface of the heat shrinkable film 11 which the hologram film 20 contacts. The offset of the hologram layer 20 onto the back surface can be prevented by providing the resinous offset preventing layer 23 on the back surface of the heat shrinkable film 11.

Then, the heat shrinkable hologram layer 20 will be explained. The hologram layer 20 may be an optical diffraction pattern, and the optical diffraction pattern is a laser reconstructed hologram, such as a Fresnel hologram, a Fraunhofer hologram, a lensless Fourier transform hologram, an image hologram or others, a white light reconstructed hologram, such as a Rayleigh hologram, a color hologram using Rayleigh hologram principle, a computer hologram, a hologram display, multiplex hologram, holographic stereogram, and/or a holographic diffraction grating using hologram memory means. In addition thereto, a hologram that can numerically provide an arbitrary diffracted by a diffraction grating mechanically formed by an electron-beam lithography system, etc. can be used. They may be recorded single or multiplex.

In the present invention, as a method for forming the hologram layer 20 on a front surface of the heat shrinkable film 11, for example, a heat transfer method using a heat transfer sheet 24 having the hologram layer 20, or an adhering method using an adhesive seal 26 having the hologram layer 20, or other methods can be used.

The heat transfer method will be detailed below. First, as shown in FIG. 1, for example, a base material 21 of a 12–25 μm-thickness transparent polyethylene terephthalate film is prepared, and, if necessary, a composition containing vinyl chloride-vinyl acetate copolymer as a vehicle is applied to a base material 21 as a peeling layer 22 of an 0.1 μm-thickness. Then, a composition containing, e.g., an acryl-based resin as a vehicle is applied as a protective layer 16 of an 1 μm-thickness to the peeling layer 22. A composition containing, e.g., polymethyl methacrylate as a vehicle is applied to the protective layer 16, and fine concavities and convexities are formed in the front surface of the composition by means of a stamper or others to form a hologram relief layer 15 of an 2 μm-thickness. Then, an 1000 Å-thickness aluminium layer or a 500 Å-thickness titanium oxide layer is formed on the hologram relief layer 15 as a reflecting layer 14 by vacuum evaporation. Then, for example, a composition containing as a vehicle vinyl chloride-vinyl acetate copolymer or an acryl-based resin is applied to the reflecting layer 14 as a heat-sensitive adhesive layer 13. Thus the heat transfer sheet 24 is formed.

Then, the heat-sensitive adhesive layer 13 of the heat transfer sheet 24 is laid on the heat shrinkable film 11, and then both are heat-pressed. Next, the base material 21 of the heat transfer sheet 24 is peeled off together with the peeling layer 22. Simultaneously therewith, the protective layer 16 and the layers below the protective layer 16 are heat transferred and adhered to the front surface of the heat shrinkable film 11. Thus the hologram layer 20 is formed on the front surface of the heat shrinkable film 11. The hologram layer 20 comprises the heat-sensitive adhesive layer 13, the reflecting layer 14, the hologram relief layer 15 and the protective layer 16.

Next, the adhering method will be explained. First, for example, the hologram relief layer 15 is formed on the 50 μm-thickness protective layer 16 of transparent polyethylene terephthalate is formed. Next, the reflecting layer 14 is formed on the relief layer 15, and then an adhesive composition containing, e.g., an acryl-based resin or polvinyl acetate-based resin is applied to the reflecting layer 14 to form the adhesive layer 13a of a 20–30 μm thickness. Then, a release sheet 25 of a 100 μm-thickness polyethylene terephthalate film is adhered to the adhesive layer 13a. Thus an adhesive seal 26 is formed.

Then, the release sheet 25 is peeled from the adhesive seal 26 and is adhered to the heat shrinkable film 11 through the adhesive layer 13a, and the hologram layer 20 is formed on the front surface of the heat shrinkable film 11. The hologram layer 20 comprises the adhesive layer 13a, the reflecting layer 14, the hologram relief layer 15 and the protective layer 16.

As described above, in forming the hologram layer 20 on the front surface of the heat shrinkable film 11, a printed pattern layer 12 is formed on the back surface of the shrinkable film 11, and then the hologram layer 20 is formed on the front surface of the heat shrinkable film 11 in harmony with the designs on the printed pattern layer.

In the present invention, in a case, for example, where the hologram layer 20 alone has an ornamental effect from the ornamental viewpoint, only the hologram layer 20 is formed without the printed pattern layer 12 on the back surface of the heat shrinkable film 11.

Then, the printed pattern layer 12 on the heat shrinkable film 11 in the present invention will be explained. The printed pattern layer 12 is formed by a usual method in which, for example, arbitrary print patterns, such as letters, figures, marks, patterns, etc. are formed on the back surface of the heat shrinkable film 11 with offset ink or gravure ink or others by a usual printing, such as offset or gravure or others.

In this case, by the use of special color inks, such as fluorescent ink, light emitting ink, gold and silver inks, etc. fluorescent printed patterns, light emitting printed patterns, relief printed patterns, etc. are made on the printed pattern layer 12.

Furthermore, in the present invention, patterns of gold and silver foils may be formed on the printed pattern layer 12 by foil hot-stamping.

Then, a shrink-packaging using the packaging film 10 comprising, as described above, the printed pattern layer 12 and the hologram layer 20 on the heat shrinkable film 11 will be explained. First, an information storage medium 30a is placed in the case 30, and the case 30 is packaged with the heat shrinkable film 11 comprising the printed pattern layer 12, the hologram layer 20, etc. on the heat shrinkable film 11. Then two sides or three sides of the packaging film 11 are sealed by a sealer, and the packaged article is passed through a shrink tunnel. The heat shrinkable film 11 shrinks to be tight contour to a shape of the article. The case 30 containing an information storage medium 30a is thus packaged with the packaging film 10, and the information storage medium packaging body is prepared.

EXAMPLES

Next the present invention will be explained more specifically by means of examples of the present invention.

Example 1

A composition containing vinyl chloride-vinyl acetate copolymer as a vehicle was applied to a 25 μm-thickness transparent polyethylene terephthalate film (base material), and the peeling layer of a 0.1 μm-thickness was formed. A composition containing an acryl-based resin as a vehicle was applied to the peeling layer and the protective layer of a 1 μm-thickness was formed. Furthermore, a composition containing polymethyl methacrylate as the vehicle was applied to the protective layer. Fine concavities and convexities were formed in the front surface of the composition by means of a stamper, and the hologram relief layer of a 2 μm-thickness was formed. A 1000 Å-thickness aluminum layer was formed on the hologram relief layer by vacuum evaporation, and the reflecting layer was formed. To the reflecting layer a composition containing vinyl chloride-vinyl acetate copolymer as a vehicle was applied, and the heat-sensitive adhesive layer of a 2 μm-thickness was formed. Thus the heat transfer sheet was prepared.

Then, a prescribed printed pattern layer was formed on a polypropylene film (heat shrinkable film) having a 25 μm-thickness, and a 4% longitudinal elongation rate and a 6% lateral elongation rate at 150° C., and then the above-described heat transfer sheet is laid on the polypropylene film so that the heat-sensitive adhesive layer thereof can be in contact with the surface of the polypropylene film opposite to the printed pattern layer. Next, both were heat-pressed at a heating temperature of 130° C., at a pressure of 2 kg/cm², and for 0.5 seconds. Then, the base material of the heat transfer sheet was peeled off, and the protective layer of the heat transfer sheet and the other layers laid below the protective layer were heat transferred to the front surface of polypropylene film and adhered thereto. Thus the hologram layer was formed on the front surface of heat shrinkable polypropylene film. Next, a case containing an information storage medium was packaged with the polypropylene film comprising the printed pattern layer and the hologram layer. Then, three sides of the packaging sheet were sealed, and the package was passed through a shrink tunnel at 180° C. and shrink packaged.

The thus-prepared information storage medium packaging body could have a very innovative ornamental effect and improve the commodity appeal by the printed patterns, and the hologram of the hologram layer. The hologram of the hologram layer could hinder counterfeiting the commodity.

Example 2

In feeding a roll of the packaging film described in Example 1 to enable continuous packaging, in a case where the back surface of the heat shrinkable film which contacts the hologram layer is plain, a part or all of the hologram layer is transferred to the back surface by a rolling pressure, with the result that the appearance is spoiled. To remove this phenomenon, urethane resin-based varnish was applied (in a 1 μm-thickness) to the part of the back surface of the heat shrinkable film which the hologram layer contacts, except the heat seal portion, to form the offset preventing layer. Thus, the offset of the hologram layer could be prevented.

As described above, according to the present invention, by providing the ornamental hologram layer, images on the hologram layer, etc. can be seen three-dimensional patterns, shapes, etc. are changed at view angles, whereby an innovational ornamental effect which has not been conventionally available, can be exhibited. It is expected that the hologram layer has the effect of prohibiting counterfeits.

What is claimed is:

1. An information storage medium packaging body comprising an information storage medium for storing audio information or video information, a case for containing the information storage medium, and a packaging film for packaging the case, the packaging film comprising:

a heat shrinkable film;

a hologram layer formed on one surface of the heat shrinkable film; and an offset preventing layer formed on the other surface of the heat shrinkable film, for preventing an offset of the hologram layer.

2. The information storage medium packaging body according to claim 1, wherein the heat shrinkable film is a polypropylene film.

3. The information storage medium packaging body according to claim 1, wherein the heat shrinkable film has a longitudinal heat shrinkage rate of 3–15% and a lateral heat shrinkage rate of 4–20%.

4. The information storage medium packaging body according to claim 1, wherein the hologram layer comprises at least a heat seal layer, a reflecting layer and a relief layer.

5. The information storage medium packaging body according to claim 1, wherein a printed pattern layer is formed on said other surface of the heat shrinkable film.

6. The information storage medium packaging body according to claim 1, wherein the hologram layer comprises at least an adhesive layer, a reflecting layer and a relief layer.

7. The information storage medium packaging body according to claim 1, wherein the offset preventing layer is formed of a urethane resin-based varnish.

* * * * *